(12) United States Patent
Roz

(10) Patent No.: US 6,462,647 B1
(45) Date of Patent: Oct. 8, 2002

(54) RECHARGEABLE ACTIVE TRANSPONDER

(75) Inventor: Thierry Roz, Prêles (CH)

(73) Assignee: EM Microelectronic-Marin SA (CH)

( * ) Notice: Subject to any disclaimer, the term of this patent is extended or adjusted under 35 U.S.C. 154(b) by 0 days.

(21) Appl. No.: 09/430,164

(22) Filed: Oct. 29, 1999

(30) Foreign Application Priority Data

Nov. 3, 1998 (EP) .......................................... 98120833

(51) Int. Cl.[7] ................................................ H04Q 5/22
(52) U.S. Cl. ................... 340/10.1; 340/10.34; 340/10.4
(58) Field of Search ............................ 340/10.1, 10.34, 340/10.4; 73/146.5

(56) References Cited

U.S. PATENT DOCUMENTS

| | | | | |
|---|---|---|---|---|
| 4,962,485 A | | 10/1990 | Kato et al. ................... | 365/229 |
| 5,483,827 A | * | 1/1996 | Kulka et al. ................. | 73/146.5 |
| 5,606,323 A | * | 2/1997 | Heinrich et al. ............ | 340/10.4 |
| 5,822,683 A | * | 10/1998 | Paschen .................... | 340/10.34 |
| 5,850,181 A | * | 12/1998 | Heinrich et al. ............ | 340/10.4 |

FOREIGN PATENT DOCUMENTS

GB 2 292 866 8/1995

* cited by examiner

Primary Examiner—Daryl Pope
(74) Attorney, Agent, or Firm—Griffin & Szipl, P.C.

(57) ABSTRACT

The present invention concerns an active transponder (30) including an antenna (32) for exchanging a radioelectric signal (34), processing means (36), an accumulator (38) able to supply a first power supply signal (V1), and storage means (40) able to store the power originating from the received radioelectric signal, and to supply a second power supply signal (V2). This transponder further includes: two means (42, 46) for comparing the two power supply signals to a minimum threshold (Vmin) and, in response, providing two control signals (V3, V4); and charging means (50) controlled by the two control signals, so that the accumulator can be charged, via the charging means, from the stored power. One advantage of such a transponder is that the accumulator can be automatically recharged, as soon as the latter is no longer sufficiently charged to assure the functions of the transponder.

12 Claims, 7 Drawing Sheets

RECHARGEABLE ACTIVE TRANSPONDER

The present invention concerns the field of active transponders and, more precisely, active transponders able to be switched into passive transponders.

There conventionally exist a large number of portable devices for the contactless identification of an unknown object. A portable device of this type contains data able to be transferred, in the form of radioelectric signals, between a fixed base station acting as transceiver and this device. A portable device of this type is usually made using a transponder.

One will recall that there conventionally exist two types of transponders: passive transponders and active transponders.

A passive transponder is arranged for converting a radioelectric signal originating from a base station, into an electric voltage which then supplies the electric power necessary for the transponder's operation.

A passive transponder of this type includes an antenna to be able to receive and transmit radioelectric signals containing data, a storage capacitor connected to the antenna, to be able to store the electric power received by the antenna, and an integrated circuit connected to the antenna and to the storage capacitor, to be able to process the data received by the antenna, and to provide thereto other data to be transmitted in the form of radioelectric signals. It will be noted that, in such a transponder, the storage capacitor supplies electric power to the integrated circuit.

One drawback of such a passive transponder is that contactless interrogation of the transponder requires a small distance between the base station base and the transponder, this distance being of the order of several meters. It is necessary for the passive transponder to be at a small distance from the base station for the transponder to receive sufficient power for its operation. In the event that such a passive transponder is incorporated in a vehicle door key, the user of the key must therefore be a short distance from the vehicle.

An active transponder is arranged for transmitting data over long distances of the order of several hundreds of meters. Indeed, contactless interrogating such an active transponder does not require a short distance between the base station and the transponder, since no transfer of energy occurs from the base station to the transponder.

FIG. 1 shows an active transponder of this type designated by the reference 1. This transponder includes an antenna 3 arranged so as to be able to receive and transmit radioelectric signals 4 containing data, an integrated circuit 5 connected to antenna 3, to be able to process data received by antenna 3, and to provide the latter with other data to be transmitted in the form of radioelectric signals. Active transponder 1 further includes a battery 7 able to supply power to the various components of transponder 1.

One drawback of active transponder 1 is that it operates normally, as long as battery 7 provides sufficient electric voltage to supply the set of components of transponder 1. In the event that the latter is incorporated in a vehicle door key, as soon as battery 7 no longer supplies a sufficient voltage level to assure the proper operation of transponder 1, the latter no longer allows the door opening command to be provided, which is generally inconvenient for the user of the vehicle.

There also exists in the state of the art <<mixed>> or <<dual>> active transponders, i.e. active transponders which can be switched into passive transponders. GB Pat. No. 2,292,866 discloses such a dual transponder.

FIG. 2 of the present description shows a dual transponder 10 which includes an antenna circuit 11, a modulation-demodulation circuit 14, a rectifier circuit 15, a storage capacitor 16, a battery 18, a central processing unit 20, a read only (ROM) memory 21, a random-access (RAM) memory 22, a clock system 23 and a switching circuit 26.

Antenna circuit 11 is arranged for receiving and transmitting data to and from an external device in the form of a radiofrequency wave 12. For this purpose, antenna circuit 11 includes an antenna 11a formed by a coil and a capacitor 11b.

Modulation-demodulation circuit 14 is arranged for modulating a digital signal received from a control circuit 25 into an analogue signal, and for demodulating an analogue signal received via antenna 11a into a digital signal. The reference 13 designates a line via which a received signal is transferred from antenna 11a to demodulation-modulation circuit 14, and via which a signal to be transmitted is transferred from modulation-demodulation circuit 3 to antenna 11a. Rectifier circuit 15 is formed by a bridge circuit comprising diodes 15a to 15d for converting an alternating voltage from radiofrequency wave 12 received by antenna 11a into a DC voltage V2. Storage capacitor 16 is arranged for storing rectified DC voltage V2, this latter being intended to be provided to the different components via a connection line 17.

Central processing unit 20 is arranged for processing data in accordance with an execution programme. ROM memory 21 is arranged for storing the execution programme. RAM memory 22 is arranged for temporarily storing data. Clock system 23 is arranged for providing a clock signal in response to which processing unit 20 operates. The reference 24 designates a bus via which data and addresses are transmitted.

Battery 18 is arranged for providing an electric voltage V1 intended to supply the various components of transponder 10, via a connection line 19. It will be noted that the operating voltage of transponder 10 is of the order of 5 volts.

Switching circuit 26 is connected to lines 19 and 17, and is arranged so that, when voltage V2 across the terminals of storage capacitor 16 is greater than voltage V1, transponder 10 operates by using the electric power supplied by storage capacitor 16, via line 17, and so that, when voltage V2 is less than voltage V1, transponder 10 operates by using the electric power supplied by battery 1, via line 19.

One drawback of transponder 10 lies in the fact that, once battery 18 has run down, the electric power supply of the components of transponder 10 can only be supplied by storage capacitor 16. In the event that transponder 10 is incorporated in a vehicle door key, the transponder must be situated at a short distance from the base station so as to receive sufficient power from the base station to operate. In other words, once battery 18 has run down, the user of the key has to wait the time necessary for capacitor 16 to charge, before identification can occur, which can be particularly inconvenient for the user.

An object of the present invention is to provide a dual transponder which overcomes the drawbacks of conventional active transponders, in particular an active transponder which allows a power supply level sufficient to assure its operation to be maintained.

Another object of the present invention is to provide an active transponder which answers the conventional criteria in the semiconductor industry as to complexity and cost.

These objects, in addition to others, are achieved by the active transponder according to claim 1.

The invention concerns an active transponder including in particular first and second means for comparing respectively the first and second supply signals to a minimum threshold provided by first supply means and, in response, to supply respectively first and second control signals and charging means controlled by the first and second control signals, and arranged so that, when the first and second supply signals are respectively less than and greater than the minimum threshold, the accumulator is charged, via the charging means, from the energy contained in the storage means.

One advantage of such an arrangement of the charging means and the first and second comparison means is that the accumulator charge is controlled, as soon as the supply voltage becomes less than the minimum threshold.

According to another feature of the transponder according to the present invention, the minimum threshold corresponds to the minimum level of supply voltage necessary to assure all the functions of the transponder, which has the advantage of supplying the transponder with sufficient power to assure all the functions of the transponder.

Another advantage of the comparison of the first supply voltage to such a minimum threshold is that it prevents the accumulator being completely run down during the operation thereof, which avoids short-circuiting the processing means.

According to another feature of the transponder according to the present invention, the first comparison means can compare the first supply voltage to a maximum threshold which represents the upper accumulator charge limit, which has the advantage of avoiding overloading the accumulator.

According to another feature of the transponder according to the present invention, the processing means are arranged for receiving the electric power from the storage means when the accumulator is charging, and from the accumulator once it is charged. One advantage of such an arrangement of the processing means is that centralised control of the electric power supply of the transponder components can be achieved.

These objects, features and advantages of the present invention, in addition to others, will appear more clearly upon reading the detailed description of three preferred embodiments of the invention, given solely by way of example, with reference to the annexed drawings, in which:

FIG. 1 which has already been cited, shows a conventional active transponder;

FIG. 2 which has already been cited, shows a conventional dual transponder;

FIG. 3 shows a first preferred embodiment of the active transponder according to the present invention, designated by the reference 30.

Figure 1:
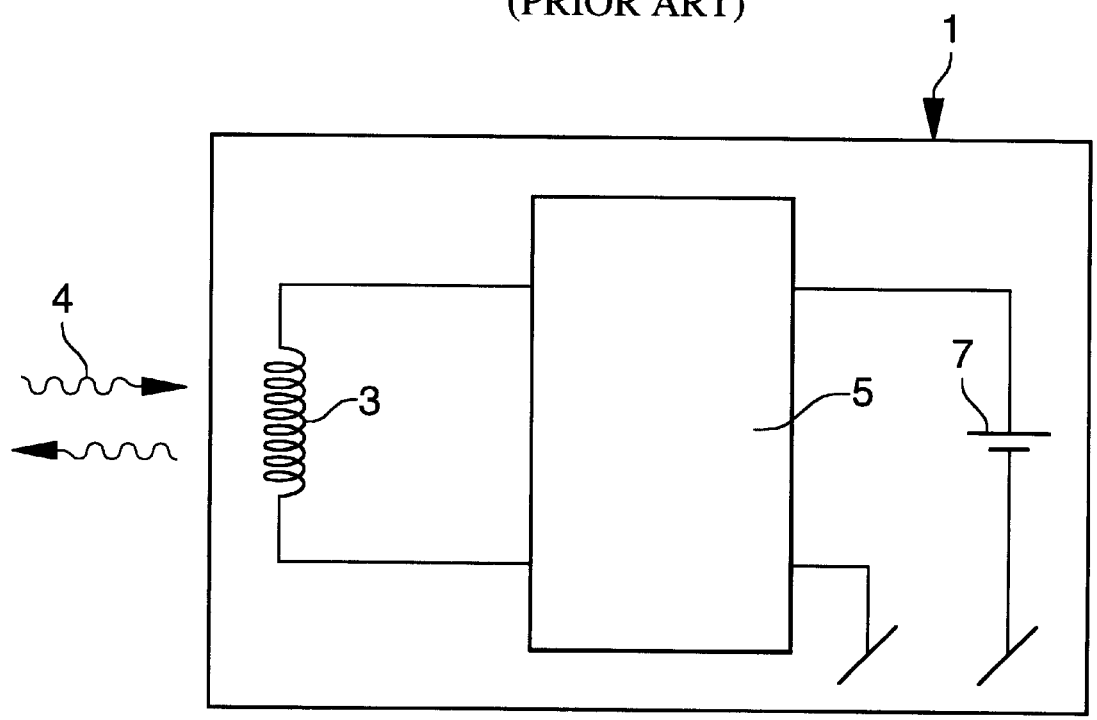

Transponder 30 includes an antenna 32, processing means 36, an accumulator 38 and storage means 40.

Antenna 32 is arranged so as to be able to receive and transmit data to and from an external device (for example a conventional base station), in the form of a radiofrequency signal 34. Antenna 32 is therefore preferably made by using a coil connected across two connection terminals 320 and 321, in a known manner.

Processing means 36 further include two connection terminals 360 and 361 connected respectively to terminals 320 and 321 of antenna 32. Processing means 36 are arranged so as to be able to receive from antenna 32 the received data, process such data, and to supply antenna 32 with identification data to be transmitted in the form of a radiofrequency signal. For this purpose, processing means 36 include a logic block which may include a central processing unit (not shown in FIG. 3), memory means (not shown in FIG. 3), and a clock system (not shown in FIG. 3).

Figure 2:
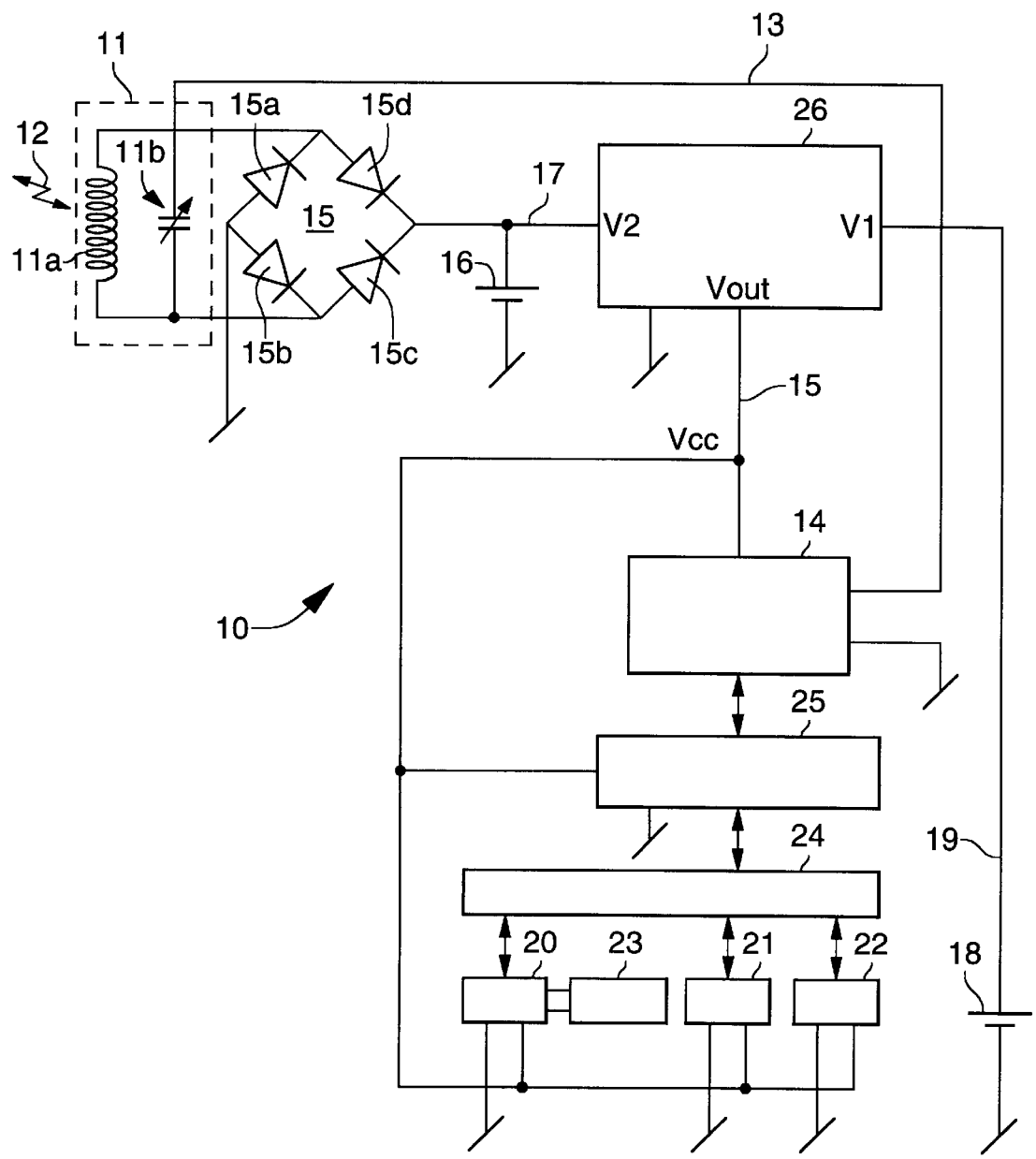

Said central processing unit, memory means and clock system are preferably made in the same way as the components described in relation to FIG. 2.

Processing means 36 are also arranged so as to be able to convert radiofrequency signal 34 into a power supply able to provide a DC voltage V2. For this purpose, processing means 36 include an interface including a modulation-demodulation circuit (not shown in FIG. 3), a rectifier circuit (not shown in FIG. 3) and a terminal 364 connected to storage means 40.

Said modulation-demodulation circuit and said rectifier circuit are preferably made in the same way as the components described in relation to FIG. 2.

Storage means 40 are also preferably made by forming a capacitor including a terminal 400 connected to terminal 364 of processing means 36, and an earth terminal 401 connected to the earth of transponder 30, so that the voltage present across terminals 400 and 401 is equal to DC voltage V2. By way of illustration only, storage means 40 can contain an electric charge equivalent to a voltage of the order of 2 to 6 volts.

Processing means 36 include an earth terminal 362 connected to the earth of transponder 10, and a supply terminal 363 intended to receive a supply voltage V1 supplied by accumulator 38.

Accumulator 38 is arranged so as to be able to supply voltage V1, this latter having to be sufficient to supply electrically all the components of transponder 30. For this purpose, accumulator 38 includes a supply terminal 380 for supply voltage V1, and an earth terminal 381 connected to the earth of transponder 30. Accumulator 38 is preferably made using a conventional accumulator.

Transponder 30 further includes two comparison means 42 and 46, and charging means 50.

Comparison means 42 are arranged so as to be able to compare electric voltage V1 supplied by the accumulator to a predetermined minimum threshold voltage Vmin and, in response, to supply an electric voltage V3 so that, when voltage V1 is less than threshold Vmin, voltage V3 is equal to a voltage level <<0>> and so that, when voltage V1 is greater than threshold Vmin, voltage V3 is equal to a voltage level <<1>>.

For this purpose, comparison means 42 include a first input terminal 420 connected to supply means 44, for receiving threshold Vmin, and a second input terminal 421 connected to terminal 380 of accumulator 38, for receiving voltage V1. Comparison means 42 also include an output terminal 422, for supplying voltage V3 containing the result of the comparison between voltage V1 and threshold Vmin. Output terminal 422 of comparison means 42 is connected to charging means 50, as is described hereinafter.

Comparison means 42 are preferably made using an operating amplifier, in a known manner.

Figure 3:
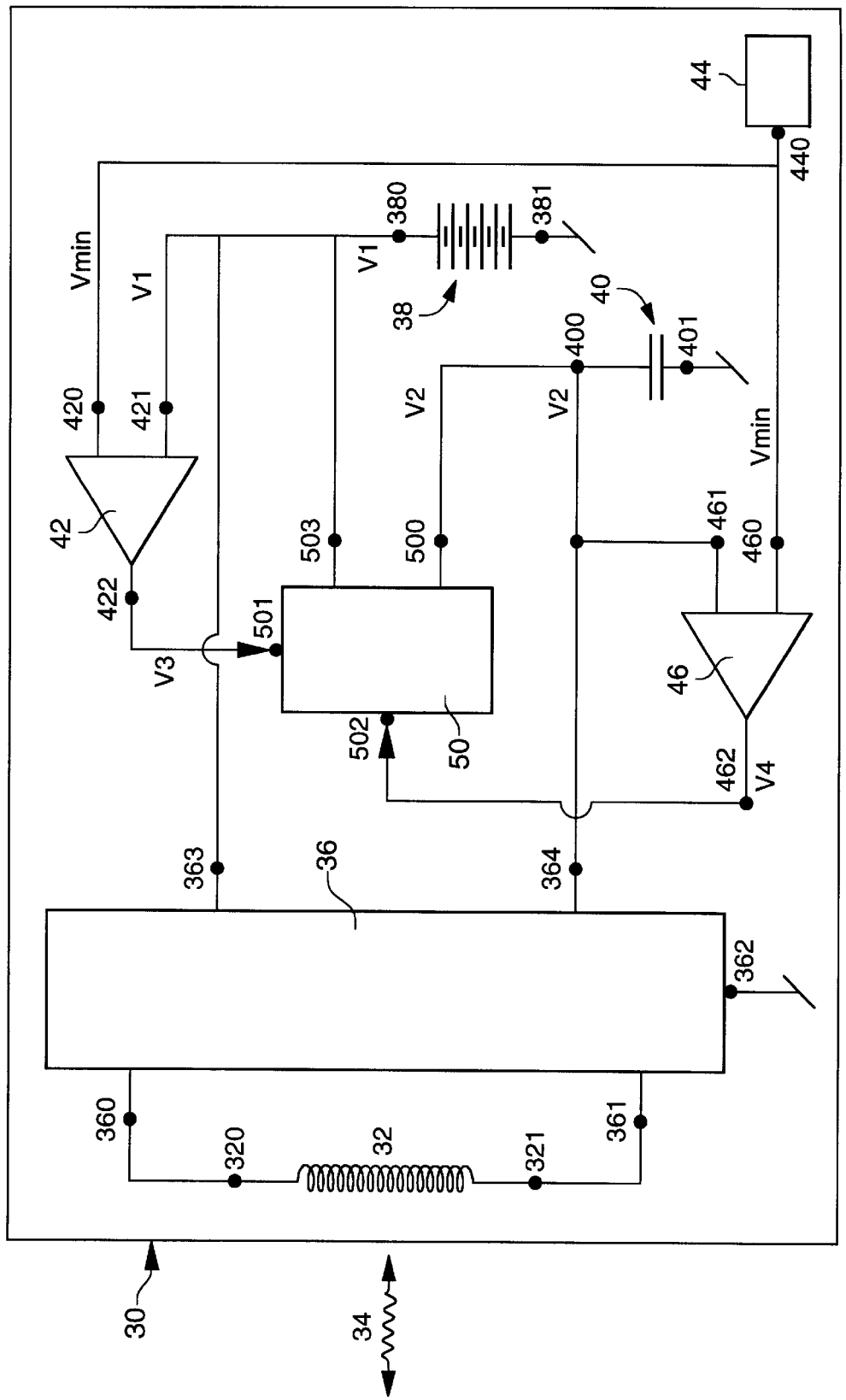
FIG. 3 shows a first preferred embodiment of the active transponder according to the present invention.

Supply means 44 include an output terminal 440 connected to terminal 420 of comparison means 42, to supply threshold Vmin, as well as a supply terminal and an earth terminal, these latter not being shown in FIG. 3. Supply means 44 are arranged so that the value of threshold Vmin is sufficient to answer predetermined criteria as to the proper operation of transponder 30, i.e. to determine whether the voltage value supplied by the accumulator is sufficient for the electric supply of transponder 30, i.e. to assure all the functions of transponder 30.

Supply means 44 are preferably made using a conventional reference voltage source.

Like comparison means 42, comparison means 46 are arranged so as to be able to compare electric voltage V2 present across terminals 400 and 401 of storage means 40 to threshold Vmin and, in response, to supply an electric voltage V4 so that, when voltage V2 is less than threshold Vmin, voltage V4 is equal to voltage level <<1>> and so that, when voltage V2 is greater than threshold Vmin, voltage V4 is equal to voltage level <<0>>For this purpose, comparison means 46 include a first input terminal 460 connected to terminal 440 of supply means 44, for receiving threshold Vmin, and second input terminal 461 connected to terminal 400 of storage means 40, for receiving voltage V2. Comparison means 46 also include an output terminal 462, for supplying electric voltage V4 containing the result of the comparison between voltage V2 and threshold Vmin. Output terminal 462 of comparison means 46 is connected to charging means 50, as is described hereinafter.

Comparison means 46 are preferably made using an operational amplifier, in a known manner.

Charging means 50 are arranged so as to be able to charge accumulator 38 from the power stored in storage means 40 (i.e. from voltage V2), in response to the comparisons of voltages V1 and V2 to threshold Vmin (i.e. in response to voltages V3 and V4).

For this purpose, charging means 50 include a first input terminal 500 connected to terminal 400 of storage means 40, for receiving voltage V2, and second and third input terminals 501 and 502 respectively connected to output terminals 422 and 462, for receiving respective voltages V3 and V4. Charging means 50 also include an output terminal 503 connected to terminal 380 of accumulator 38, via which charging of accumulator 38 occurs, as is described hereinafter.

Figure 4:
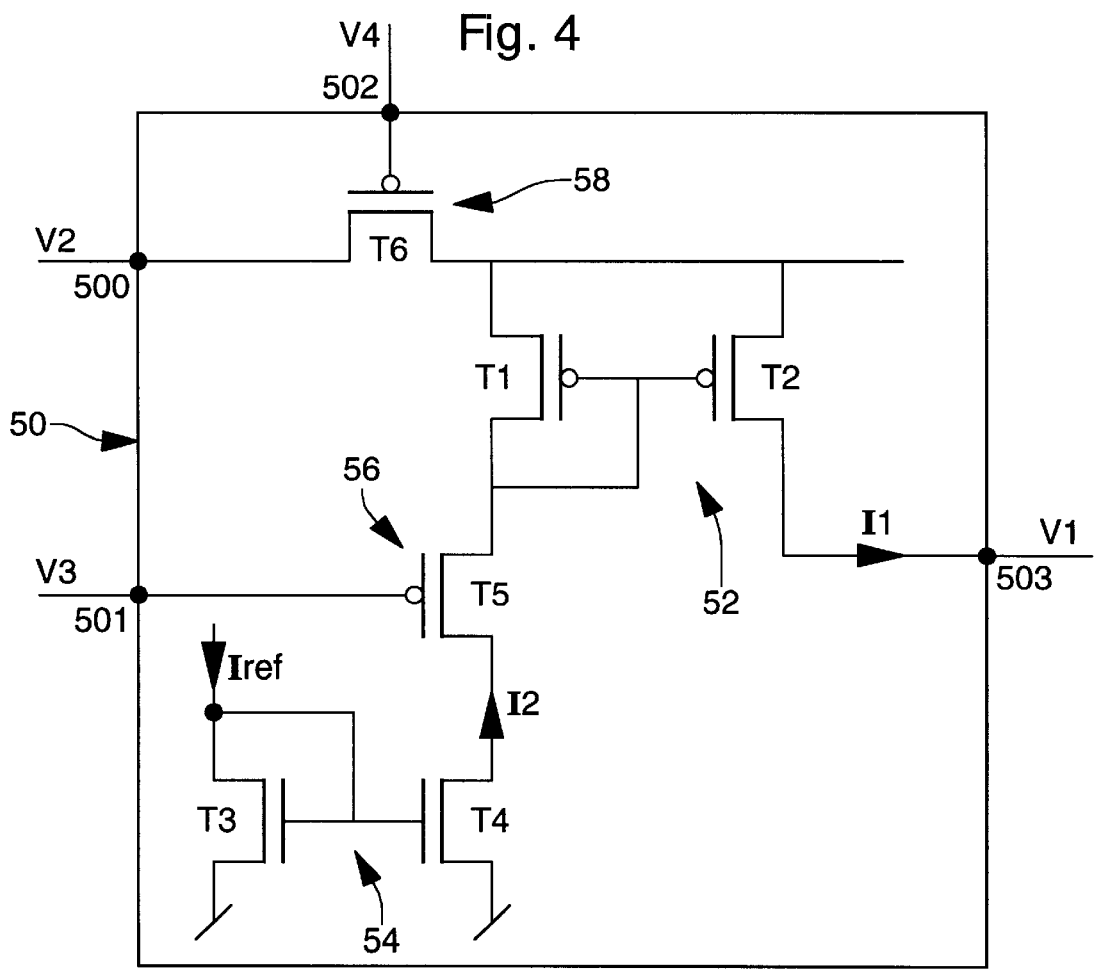
FIG. 4 shows in detail a component of the active transponder of FIG. 3.

FIG. 4 shows charging means 50 of active transponder 30 of FIG. 3 in detail.

As FIG. 4 shows, charging means 50 include a current mirror 52 able to supply, via terminal 503, a charging current I1, a current source 54 able to supply a first reference current I2, a first switch 56 connected to terminal 501, so as to be able to be controlled by voltage V3, and a second switch 58 connected to terminal 502, so as to be able to be controlled by voltage V4.

Current mirror 52 is connected to terminal 500, via switch 58, so that voltage V2 acts as supply voltage for current mirror 52. Current mirror 52 is also connected to current source 54, via switch 56, so that current I2 can be recopied by current mirror 52 in the form of current I1.

Current mirror 52 is preferably made from two field effect transistors T1 and T2, in a known manner. Likewise, current source 54 is made from a current mirror formed of two field effect transistors T3 and T4, this mirror receiving a second reference current Iref supplied by a temperature stabilised current source (not shown in FIG. 4). Moreover, switches 56 and 58 are made by forming respectively two field effect transistors T5 and T6 controlled by voltages V3 and V4 respectively.

It will be noted in FIG. 4 that transistors T1, T2, T5 and T6 each have a P type channel, and that transistors T3 and T4 each have an N type channel.

The operation of charging means 50, in response to the supply of control voltages V3 and V4 at the respective terminals 501 and 502 thereof, will now be briefly described.

With reference again to FIG. 4, let us consider a first situation in which voltage V3 is equal to level <<1>>. As a result, transistor T5 is blocked and current source 54 is thus not connected to current mirror 52. Let us further assume that voltage V4 is equal to level <<1>>. As a result, transistor T6 is not blocked, and current mirror 52 is then supplied by voltage V2 present at terminal 500.

Let us now consider a second situation in which voltages V3 and V4 are each equal to level <<0>>. As a result, transistors T5 and T6 are conductive, and current source 54 is then connected to current mirror 52 which is itself supplied by voltage V2. Consequently, current mirror 52 supplies charging current I1, via terminal 503.

Those skilled in the art will note that one advantage of the arrangement of charging means 50 and comparison means 42 and 46 in transponder 30 is that charging of accumulator 38 is controlled?, as soon as voltage V1 supplied by the latter becomes less than threshold Vmin, i.e. as soon as accumulator 38 can no longer assure sufficient electric power supply for transponder 30. In other words, active transponder 30 has the advantage of being able to recharge accumulator 38 automatically, as soon as the latter is no longer sufficiently charged to assure all the functions of transponder 30.

The set of components of transponder 30 are preferably made by forming an integrated structure via known CMOS type manufacturing process. Typically, in the aforementioned respective preferred embodiment, processing means 36, storage means 40, comparison means 42 and 46 and charging means 50 are made in a monolithic manner in a single semiconductor substrate. By way of variant, in addition to these components, antenna 42 can also be made in a monolithic manner.

Figure 5:
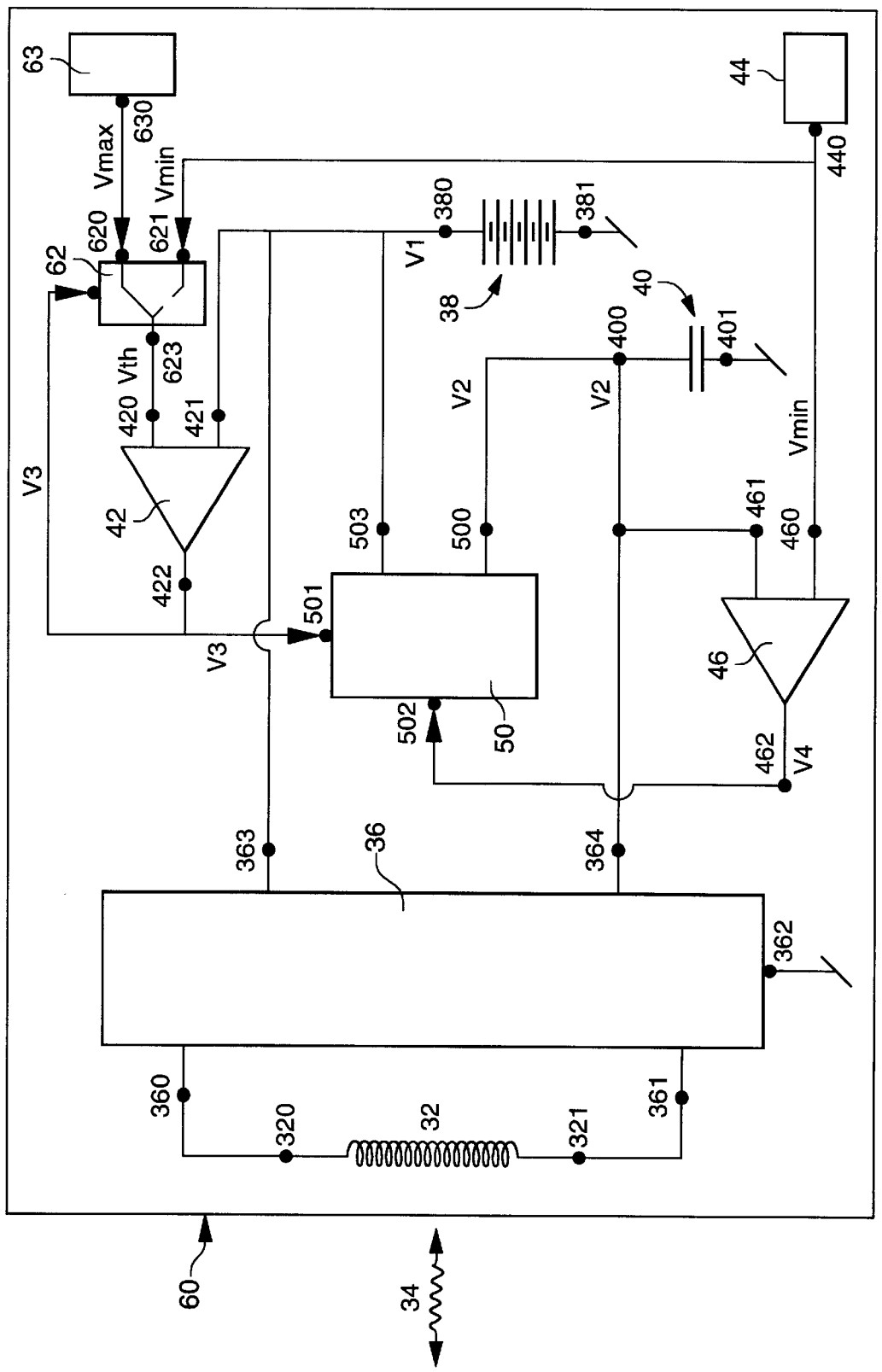
FIG. 5 shows a second embodiment of the active transponder according to the present invention.
Figure 7:
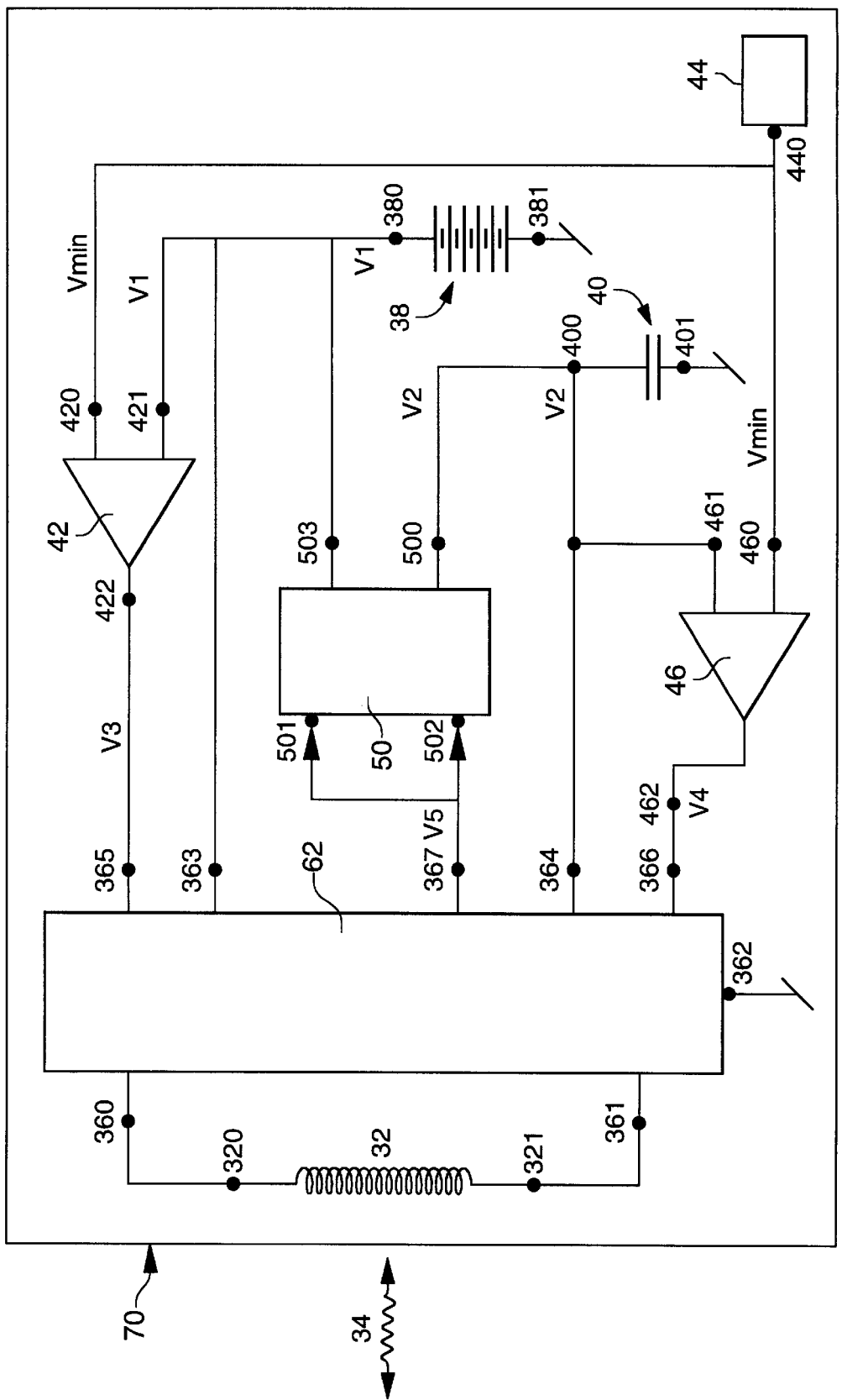
FIG. 7 shows a third embodiment of the active transponder according to the present invention.

By way of alternative embodiment of active transponder 30 of FIG. 3, FIGS. 5 and 7 show two active transponders 60 and 70, respectively. It will be noted that the structures of transponders 60 and 70 are close to that of transponder 30. Thus, the elements of transponders 60 and 70 which are identical to those described in relation to FIG. 3 have been designated by the same references.

As FIG. 5 shows, transponder 60 further includes switching means 62 and additional supply means 63, these components being connected to comparison means 42 to form a double threshold comparator, in order to avoid overloading accumulator 38, as is described hereinafter.

Supply means 63 includes an output terminal 630 connected to switching means 62, to supply a maximum voltage threshold Vmax, as well as a supply terminal and an earth terminal, these latter not being shown in FIG. 5. Supply means 63 are arranged so that the value of threshold Vmax represents the upper charge limit of accumulator 38. Supply means 63 are preferably made using a temperature stable reference voltage source.

Switching means 62 are arranged to be able to supply to comparison means 42 a threshold Vth which is equal either to threshold Vmin, or to threshold Vmax, as a function of the result of the comparison of voltage V1.

For this purpose, switching means 62 include two input terminals 620 and 621 respectively connected to terminal 630 of supply means 63 and to terminal 440 of the supply means, for receiving respectively maximum threshold Vmax and minimum threshold Vmin. Switching means 62 further include a control terminal connected to terminal 422 of comparison means 42, for receiving voltage V3, and an output terminal 623 connected to terminal 420 of comparison means 42, for supplying threshold Vth.

Switching means 62 are preferably made using two conventional transmission gates.

The operation of the arrangement of comparison means 42 and switching means 62 will be briefly described.

Figure 6:
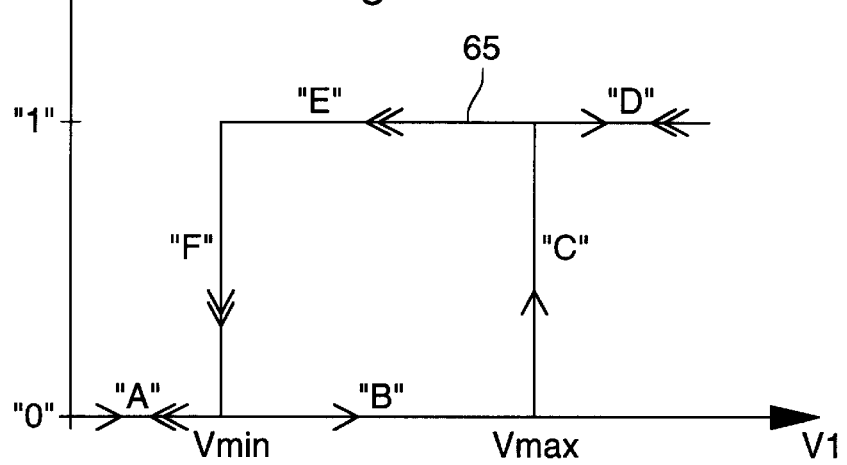
FIG. 6 shows a curve illustrating the relationship between two electric voltages present in the active transponder of FIG. 5.

FIG. 6 shows a curve 65 illustrating the relationship between voltage V1 supplied by accumulator 38 and voltage V3 supplied by comparison means 42, this curve including six segments <<A>> to <<F>>.

Let us consider a first situation in which voltage V1 increases or decreases so as to be less than threshold Vmin. In this situation, voltage V3 is equal to a first voltage level designated <<0>>, as is shown by segment <<A>> of FIG. 6.

Let us now consider a second situation in which voltage V1 increases so as to be greater than threshold Vmin, but less than threshold Vmax. In this situation, voltage V3 is equal to level <<0>>, as is shown by segment <<B>> of FIG. 6.

Let us now consider a third situation in which voltage V1 reaches threshold Vmax. In this situation, voltage V3 increases abruptly from level <<0>>, to a second voltage level designated <<1>>, as is shown by segment <<C>> of FIG. 6.

Let us now consider a fourth situation in which voltage V1 increases or decreases so as to be greater than threshold Vmax. In this situation, voltage V3 is equal to level <<1>>, as is shown by segment <<D>> of FIG. 6.

Let us now consider a fifth situation in which voltage V1 decreases so as to be less than threshold Vmax, but greater than threshold Vmin. In this situation, voltage V3 is equal to level <<1>>, as is shown by segment <<E>> of FIG. 6.

Let us now consider a sixth situation in which voltage V1 decreases so as to pass threshold Vmin. In this situation, voltage V3 decreases abruptly from level <<1>> to level <<0>>, as is shown by segment <<F>> of FIG. 6.

Those skilled in the art will note that such an arrangement of switching means 62 of comparison means 42 constitutes a double threshold comparator. Those skilled in the art will also note that transponder 60 forms an improvement to transponder 30 of FIG. 3, since transponder 60 takes account of the upper charge limit of accumulator 38, which advantageously provides security for the entirety of the accumulator.

It goes without saying that a double threshold accumulator of this type can be made by different components to those described in relation to FIG. 5, while achieving the same function as that described in relation to FIG. 6.

With reference now to transponder 70 of FIG. 7, processing means 36 further includes two input terminals 365 and 366 respectively connected to output terminal 422 of comparison means 42 and to output terminal 462 of comparison means 46, and an output terminal 367 connected to terminals 501 and 502 of charging means 50.

Moreover, processing means 36 of FIG. 7 are programmed so as to be able to supply, via terminal 367, a control voltage V5 to charging means 50, in response to electric voltages V3 and V4 received by the respective terminals 365 and 366. It will be noted that such a control of charging means 50 is achieved in an identical manner to the control described in relation to FIGS. 3 and 4. For this purpose, control voltage V5 includes first and second bits containing the respective states of voltages V3 and V4.

One advantage of such an arrangement of processing means 36 is that it enables centralised control of the electric power supply of the components of transponder 70 to be achieved. Processing means 36 can be arranged so as to be able to be connected to: storage means 40 via terminal 364, when accumulator 38 is being charged (i.e. when voltages V3 and V4 are equal to respective levels <<0>>, so that the electric power necessary for supplying transponder 70 is supplied by storage means 40; and accumulator 38 via terminal 363, once accumulator 38 is charged (i.e. when voltage V3 is equal to level <<1>>), so that the electric power necessary for supplying transponder 70 is supplied by accumulator 38.

Those skilled in the art will note that, when accumulator 38 is being charged, transponder 70 operates in the same way as a passive transponder. Indeed, the electric power supply is then provided by storage means 40 which contains the power received by antenna 32 from radiofrequency signal 34 transmitted by said base station.

Figure 8:
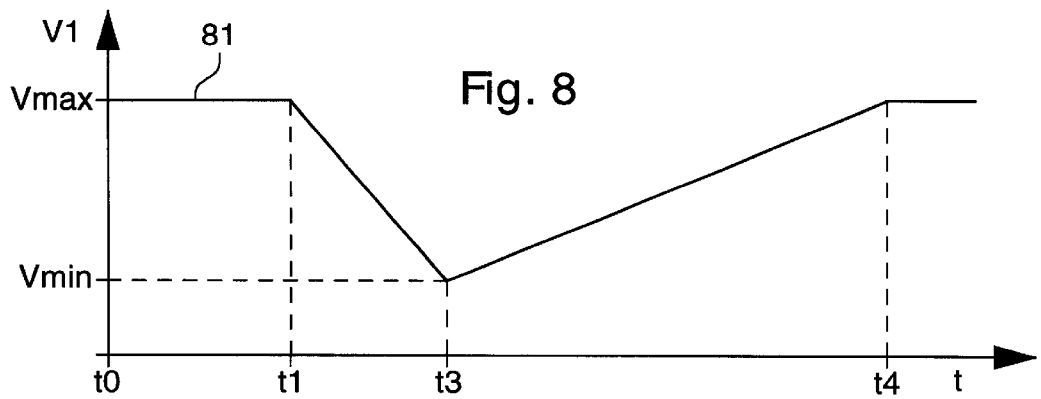
FIG. 8 shows a timing chart of an electric voltage present in the active transponder of FIG. 5.
Figure 8:
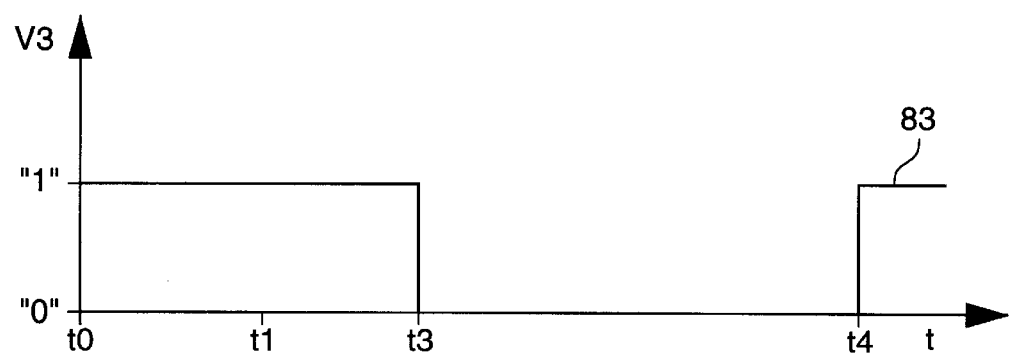
Figure 8:
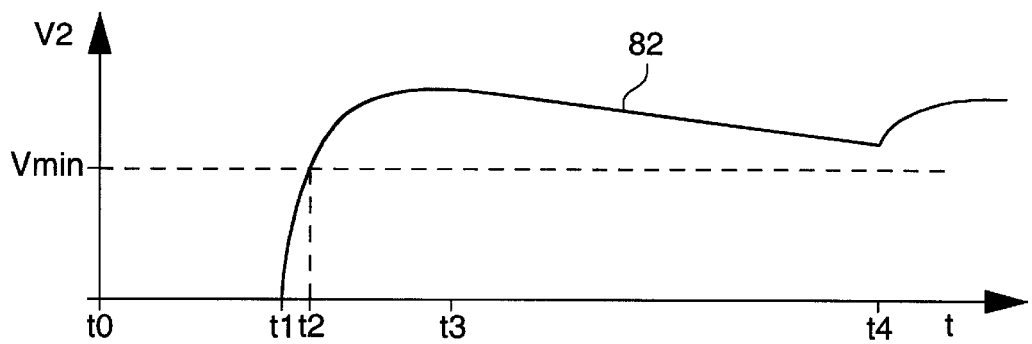
Figure 8:
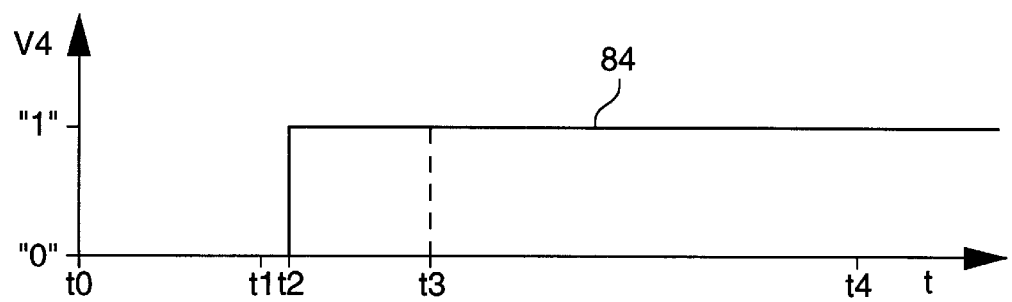

The operation of transponder 60 will now be described, with reference again to FIGS. 4 to 6 described hereinbefore, and with the aid of FIG. 8 which shows four timing charts 81 to 84 illustrating the temporal evolution of voltages V1 to V4 respectively.

Let us consider the initial situation in which voltage V1 supplied by accumulator 38 is equal to threshold Vmax, as illustrated by timing chart 81 between instants t0 and t1. In this case, voltage V3 supplied by comparison means 42 is equal to level <<1>>, between instants t0 and t1.

Let us assume now that instant t1 corresponds to an instant from which transponder 60 is in the magnetic field of a base station which transmits data and energy in the form of radiofrequency signal 34. In other words, from instant t1 onwards, antenna 32 of transponder 60 receives data and energy in the form of radiofrequency signal 34.

From instant t1 onwards, storage means 40 receive said energy from antenna 32, via processing means 36, so that voltage V2 increases until it passes threshold Vmin at an instant t2. As a result, at instant t2, voltage V4 supplied by comparison means 46 passes from level <<1>> to level <<1>>. After instant t2, voltage V2 continues to increase to a maximum level corresponding to the maximum charge that storage means 40 can store. Consequently, after instant t2, voltage V4 is equal to level <<0>>.

From instant t1 onwards, transponder 60 also receives said data from antenna 32, and processes such data, which requires consumption of electric power. This translates into a drop in the level of voltage V1, from instant t1 onwards. As long as transponder 60 is within said magnetic field, and is operating, the level of voltage V1 continues to decrease until it reaches threshold Vmin, at an instant t3.

From instant t3 onwards, voltage V1 continues to decrease and becomes less than threshold Vmin, while voltage V2 is greater than level Vmin. As a result, at instant t3, voltage V3 passes from level <<1>>, to level <<0>>. As a result charging current I1 is supplied to accumulator 38, as has already been described hereinbefore with reference to FIG. 4. In other words, from instant t3 onwards, charging means 50 are controlled to effect charging of accumulator 38. This results in an increase in voltage V1, and a drop in voltage V2.

Those skilled in the art will note that, on the one hand, storage means 40 supply the power to charging means 50 to charge accumulator 38 and that, on the other hand, they receive power from the base station, via antenna 32.

At an instant t4, voltage V1 increases and reaches threshold Vmax, which translates into the passage of voltage V3 from level <<0>> to level <<1>>. In other words, at instant t4, the charge stored in accumulator 38 is maximum, and current source 54 of charging means 50 is no longer connected to current mirror 52: the charging of accumulator 38 by charging means 50 has finished.

Solely by way of illustration, the transponder according to the present invention can advantageously be used in a vehicle door key, this latter being able to identify the key from a distance. With reference again to FIG. 5, transponder 60 can operate within the scope of this application in accordance with three different modes: <<rest>>, mode, <<identification>> mode and <<charging>> mode.

In the <<rest>> mode (i.e. in the event that the key is several hundred meters from the vehicle), no data or energy transfer occurs between antenna 32 and the vehicle. In this case, accumulator 38 is only very slightly discharged. This mode is close to the situation described in relation to timing chart 81 between instants t0 and t1.

In the <<identification>> mode (i.e. in the event that the key is in proximity to the vehicle), data is exchanged between the key and the vehicle, in the manner of a conventional active transponder. This results in a considerable consumption of electric power, and accumulator 38 is discharged. This mode is close to the situation described in relation to timing chart 81 between instants t1 and t3.

In the <<charging>> mode (i.e. in the event that the key is in intimate contact with the vehicle), power is transferred from the vehicle to the key, which allows accumulator 38 to be charged via charging means 50. This mode is close to the situation described in relation to timing chart 81 between instants t3 and t4.

It goes without saying for those skilled in the art that the above detailed description can undergo various modifications without departing from the scope of the present invention. By way of variant, the transponder charging means according to the present invention can be made by forming field effect transistors each having a channel whose type of conductivity is opposite to that described in relation to FIG. 4.

What is claimed:

1. An active transponder including:
    an antenna arranged so as to be able to receive and transmit a radioelectric signal containing data;
    processing means connected to said antenna, and arranged so as to be able to provide said antenna with identification data to be transmitted in the form of radioelectric signals;
    an accumulator arranged so as to be able to supply a first electric power supply signal to the components of said transponder; and
    storage means arranged so as to be able to store the electric energy originating from said radioelectric signal received by said antenna, and to supply a second electric power supply signal, this transponder further including:
        first and second means for comparing respectively said first and second power supply signals to a minimum threshold provided by first supply means and, in response, providing respectively first and second control signals; and
        charging means controlled by said first and second control signals, and arranged so that, when said first and second power supply signals are respectively less and greater than said minimum threshold, said accumulator is charged, via said charging means, from the power contained in said storage means.

2. A transponder according to claim 1, wherein said minimum threshold corresponds to the minimum electric power supply level necessary to assure all the functions of said transponder.

3. A transponder according to claim 1, wherein said charging means include a first current mirror able to supply a charging current, a current source able to supply a first reference current, first and second switches controlled respectively by said first and second control signals, and wherein said first current mirror is arranged so as to be able to: be supplied by said second power supply signal, as a function of the state of said first switch; and be connected to said current source, as a function of the state of said second switch, so that, when said first and second switches are conductive, said first reference current is recopied by said first current mirror in the form of said charging current.

4. A transponder according to claim 3, wherein said first current mirror is formed of first and second field effect transistors, wherein said current source is formed of a second current mirror including third and fourth field effect transistors, and receiving a second reference current supplied by a temperature stabilised current source, and in that said first and second switches are formed respectively of fifth and sixth field effect transistors controlled by said first and second control signals respectively.

5. A transponder according to claim 4, wherein said first, second, fifth and sixth field effect transistors each have a channel of a first type of conductivity, and wherein said third and fourth field effect transistors each have a channel of a second type of conductivity which is different from said first type of conductivity.

6. A transponder according to claim 1, further including a double threshold comparator including: said first comparison means and switching means able to receive said first control signal and, in response, to supply said first comparison means with a threshold which is equal either to said minimum threshold or to a maximum threshold provided by second supply means.

7. A transponder according to claim 6, wherein said maximum threshold represents the upper charge limit of said accumulator.

8. A transponder according to claim 1, wherein said processing means are arranged so as to be able to receive said first and second control signals and, in response, to supply a third control signal able to cause said accumulator to be charged.

9. A transponder according to claim 8, wherein said processing means are arranged so as to be able to receive the electric power necessary to supply said transponder: from said storage means, when said accumulator is being charged; and from said accumulator once the latter is charged sufficiently.

10. An active transponder according to claim 1, wherein said processing means, said storage means, said first and second comparison means and said charging means are made in a monolithic manner is a single semiconductor substrate.

11. An active transponder according to claim 10, wherein said antenna is made in a monolithic manner in said substrate.

12. A portable device including an active transponder an antenna arranged so as to be able to receive and transmit a radioelectric signal containing data;

processing means connected to said antenna, and arranged so as to be able to provide said antenna with identification data to be transmitted in the form of radioelectric signals;

an accumulator arranged so as to be able to supply a first electric power supply signal to the components of said transponder; and storage means arranged so as to be able to store the electric energy originating from said radioelectric signal received by said antenna, and to supply a second electric power supply signal, this transponder further including:

first and second means for comparing respectively said first and second power supply signals to a minimum threshold provided by first supply means and, in response, providing respectively first and second control signals ; and charging means controlled by said first and second control signals, and arranged so that, when said first and second power supply signals are respectively less and greater than said minimum threshold, said accumulator is charged, via said charging means, from the power contained in said storage means.

* * * * *